United States Patent
Li et al.

(10) Patent No.: US 12,084,035 B2
(45) Date of Patent: Sep. 10, 2024

(54) VEHICLE BRAKE CONTROL METHOD, DEVICE, AND STORAGE MEDIUM

(71) Applicant: GUANGZHOU AUTOMOBILE GROUP CO., LTD., Guangzhou (CN)

(72) Inventors: Qili Li, Guangzhou (CN); Haoju Hu, Guangzhou (CN); Zhouwei Chen, Guangzhou (CN); Hengbo Fan, Guangzhou (CN); Wei Deng, Guangzhou (CN)

(73) Assignee: GUANGZHOU AUTOMOBILE GROUP CO., LTD., Guangzhou (CN)

( * ) Notice: Subject to any disclaimer, the term of this patent is extended or adjusted under 35 U.S.C. 154(b) by 288 days.

(21) Appl. No.: 17/781,137

(22) PCT Filed: Jun. 15, 2021

(86) PCT No.: PCT/CN2021/100022
§ 371 (c)(1),
(2) Date: May 31, 2022

(87) PCT Pub. No.: WO2022/028115
PCT Pub. Date: Feb. 10, 2022

(65) Prior Publication Data
US 2022/0410857 A1    Dec. 29, 2022

(30) Foreign Application Priority Data
Aug. 5, 2020    (CN) ......................... 202010779229.5

(51) Int. Cl.
*B60T 7/12*    (2006.01)
*B60T 8/88*    (2006.01)
(Continued)

(52) U.S. Cl.
CPC ...... *B60T 8/92* (2013.01); *B60T 7/12* (2013.01); *B60T 17/22* (2013.01);
(Continued)

(58) Field of Classification Search
CPC ... B60T 7/12; B60T 8/88; B60T 8/885; B60T 8/92; B60T 8/94; B60T 8/96; B60T 17/22;
(Continued)

(56) References Cited

U.S. PATENT DOCUMENTS

2010/0217488 A1* 8/2010 Nijakowski ........... B60W 10/10
  701/48
2017/0341634 A1* 11/2017 Heise ..................... B60T 13/662
(Continued)

*Primary Examiner* — Erick R Solis
(74) *Attorney, Agent, or Firm* — ScienBiziP, P.C.

(57) ABSTRACT

A vehicle braking control method. The method portion includes: when a vehicle is in a preset parking state, monitoring state signal of a vehicle system in real time, the vehicle system comprises a service brake system, a reversing assistance system, and a plurality of electronic parking brake systems; determining whether the vehicle meets a preset fault condition according to the state signals of the service brake system, the electric parking brake system and reversing assistance system; activating a non-faulty electronic parking brake system to control the vehicle to park if it is determined that the vehicle meets the preset fault condition. The present disclosure ensures the safety of a vehicle during low-speed remote parking when the vehicle is in a preset parking state, and solves the problem of potential safety hazards caused by having no matching control solution. Also provided are a corresponding device and a storage medium.

20 Claims, 3 Drawing Sheets

(51) Int. Cl.
*B60T 8/92* (2006.01)
*B60T 17/22* (2006.01)

(52) U.S. Cl.
CPC ....... *B60T 2210/00* (2013.01); *B60T 2210/32* (2013.01); *B60T 2220/00* (2013.01); *B60T 2250/04* (2013.01); *B60T 2270/402* (2013.01); *B60T 2270/403* (2013.01); *B60T 2270/406* (2013.01)

(58) Field of Classification Search
CPC ............ B60T 2201/10; B60T 2210/32; B60T 2270/402; B60T 2270/403; B60T 2270/404; B60T 2270/406; B60T 2270/408
USPC ................................................ 701/70, 76, 92
See application file for complete search history.

(56) References Cited

U.S. PATENT DOCUMENTS

| | | | |
|---|---|---|---|
| 2018/0052463 A1* | 2/2018 | Mays | G07C 5/0808 |
| 2018/0251105 A1* | 9/2018 | Baehrle-Miller | B60T 7/22 |
| 2020/0122707 A1* | 4/2020 | Jost | B60W 20/50 |
| 2023/0192086 A1* | 6/2023 | Gao | B60W 10/06 |
| | | | 701/26 |

\* cited by examiner

VEHICLE BRAKE CONTROL METHOD, DEVICE, AND STORAGE MEDIUM

The present disclosure claims the priority of the Chinese invention patent application with the invention name "a vehicle brake control method, device and storage medium" submitted to the China Patent Office on Aug. 5, 2020, application No. 202010779229.5, and the whole content of which is hereby incorporated by reference.

TECHNICAL FIELD

The present disclosure relates to the technical field of automatic driving, in particular to a vehicle brake control method, device and storage medium.

BACKGROUND

In the field of automatic driving technology, the vehicle service brake control mainly depends on the body electronic stability system (ESP). After receiving the command from the advanced driving assistance system, ESP carries out corresponding deceleration control, gear control, driving torque control, parking pull-up, and release control. Since there is no human driver to control the vehicle, safety of the vehicle in low-speed remote parking needs to be ensure. Therefore, it is necessary to combine the service brake system and parking brake system to achieve service brake redundancy or parking brake redundancy of the vehicle so that when the main system fails, there is a backup system to take over control of the vehicle to ensure the safety of the vehicle.

TECHNICAL BACKGROUND

There are two brake system combination schemes in the prior art, ESP+ibooster+integrated electronic parking brake system (EPBi)+P lock, ESP+ibooster+dual electronic parking brake system (EPB). Both schemes include dual service brake system and dual parking brake system. The control scheme is controlled by the cooperation of dual service brake system and dual parking brake system. The combination of these two brake systems has high cost, and the control logic is targeted and complex. Once the matching system in the brake system combination scheme changes, the existing control scheme cannot be matched, resulting in potential safety hazards. If the vehicle adopts ESP+Dual EPB or onebox+Dual EPB, prior arts do not provide any combination of single service brake system and dual parking brake system which provides perfect control of the vehicle. When controlling the vehicle to complete remote parking, the existing control scheme cannot match the vehicle equipped with ESP+Dual EPB system combination or onebox+Dual EPB system combination, resulting in potential safety hazards during remote parking.

TECHNICAL SUMMARY

The present disclosure provides a vehicle brake control method, device, and storage medium to solve the problem that no matching control scheme in prior art can control the vehicle to complete parking in the vehicle equipped with single service brake system and dual parking brake system, resulting in potential safety hazards.

A vehicle brake control method, includes:
determining whether the vehicle is in a preset parking state;
monitoring state of a vehicle system by signals in real time if the vehicle is in the preset parking state; wherein the vehicle system comprises a service brake system, a reversing assistance system and a plurality of electronic parking brake systems;
determining whether the vehicle meets a preset fault condition according to the state signals of the service brake system, the electronic parking brake system, and the reversing assistance system;
activating non-faulty electronic parking brake system to control the vehicle to park if the vehicle is meeting the preset fault condition.

A vehicle brake control device, including:
a first determination module configured for determining whether the vehicle is in a preset parking state;
an acquisition module configured for monitoring state signal of a vehicle system in real time if the vehicle is in the preset parking state; wherein the vehicle system comprises a service brake system, a reversing assistance system, and a plurality of electronic parking brake systems;
a second determination module configured for determining whether the vehicle meets a preset fault condition according to the state signals of the service brake system, the electronic parking brake system, and the reversing assistance system;
a parking module configured for activating non-faulty electronic parking brake system to control the vehicle to park if the vehicle is meeting the preset fault condition.

A vehicle brake control device includes a memory, a processor, and computer-readable instructions stored in the memory and operable on the processor, when the processor executes the computer-readable instruction, the processor performs the following steps:
determining whether the vehicle is in a preset parking state;
monitoring state signal of a vehicle system in real time if the vehicle is in the preset parking state; wherein the vehicle system comprises a service brake system, a reversing assistance system, and a plurality of electronic parking brake systems;
determining whether the vehicle meets a preset fault condition according to the state signals of the service brake system, the electronic parking brake system, and the reversing assistance system;
activating non-faulty electronic parking brake system to control the vehicle to park if the vehicle is meeting the preset fault condition.

One or more readable storage medium storing computer-readable instructions that, when the computer-readable instructions are executed by one or more processors, causes the one or more processors to perform following steps:
determining whether the vehicle is in a preset parking state;
monitoring state signal of a vehicle system in real time if the vehicle is in the preset parking state; wherein the vehicle system comprises a service brake system, a reversing assistance system and a plurality of electronic parking brake systems;
determining whether the vehicle is meeting a preset fault condition according to the state signals of the service brake system, the electronic parking brake system, and the reversing assistance system;

activating non-faulty electronic parking brake system to control the vehicle to park if the vehicle is determined to meet the preset fault condition.

RESULTS

In the vehicle brake control method, applied by a device and storage medium, a simple control scheme is designed for the vehicles with single service brake system and dual parking brake system. When the vehicle is in the preset parking state, the vehicle is controlled by monitoring the state signals of the service brake system, park assist system, and multiple electronic parking brake systems in real time. When a determination is made that the system of the vehicle has failed according to the system state signals, the normal electronic parking brake system is activated directly to make the vehicle park in place, so as to ensure the safety of the vehicle in low-speed remote parking. The present disclosure provides matching control schemes to control the vehicle to complete parking in vehicles equipped with single service brake system and dual parking brake system.

Details of one or more embodiments of the present disclosure are set forth in the following drawings and descriptions. Other features and advantages of the present disclosure will become apparent from the description, drawings and claims.

BRIEF DESCRIPTION OF THE DRAWINGS

In order to more clearly explain the technical scheme of the embodiment of the present disclosure, the following will briefly introduce the drawings needed to be used in the description of the embodiment of the present disclosure. Obviously, the drawings in the following description are only some embodiments of the present disclosure. For those skilled in the art, other drawings can be obtained according to these drawings without paying creative work.

DETAILED DESCRIPTION

The technical solutions in the embodiments of the present disclosure will be clearly and completely described below with reference to the accompanying drawings in the embodiments of the present disclosure. Obviously, the described embodiments are only a part of the embodiments of the present disclosure, rather than all the embodiments. Based on the embodiments of the present disclosure, all other embodiments obtained by those of ordinary skill in the art without creative work fall within the protection scope of the present disclosure.

Figure 1:
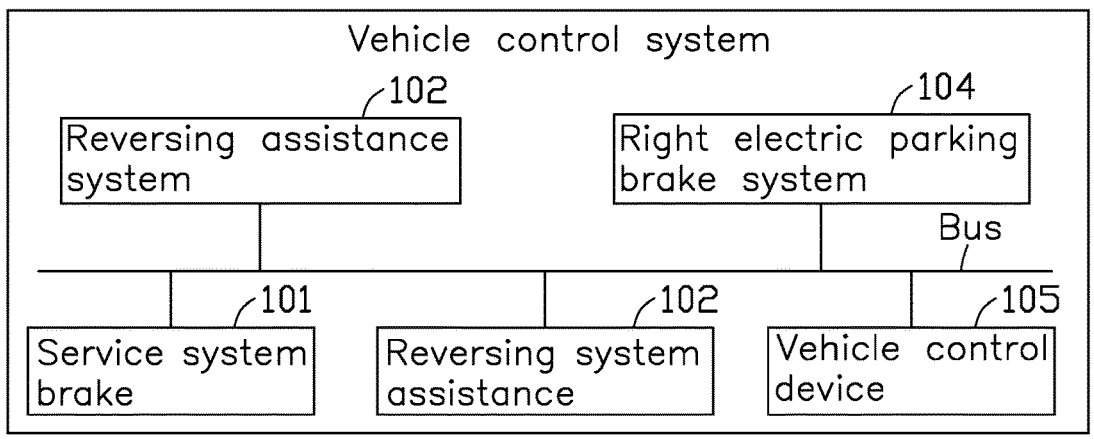
FIG. 1 is a structural diagram of a vehicle control system according to an embodiment of the present disclosure.

The vehicle brake control method provided in the embodiment of the present disclosure can be applied to the vehicle control system shown in FIG. 1. The vehicle control system includes a service brake system 101, a reversing assistance system 102, a left electric parking brake system 103, a right electric parking brake system 104, and a vehicle control device 105. The service brake system 101, the reversing assistance system 102, the left electric parking brake system 103, and the right electric parking brake system 104 communicate with the vehicle control device 105 via a bus. The vehicle control device determines whether the vehicle is in the preset parking state. If the vehicle is in the preset parking state, the state signal of the vehicle system will be monitored in real time. The vehicle system includes service brake system, reversing assistance system, and electronic parking brake system, and the method determines whether the vehicle meets the preset fault condition according to the state signals of the service brake system, the electronic parking brake system, and the reversing assistance system. If the vehicle is found to be meeting the preset fault condition, the faulty electronic parking brake system is pulled up to control the vehicle to park.

In the present disclosure, FIG. 1 the combination of the vehicle brake system as a service brake system and dual electronic parking brake system (EPB) are taken as an example to provide a vehicle control scheme that can be applied to single service brake system and dual parking brake system, to ensure the safety of the vehicle. The service brake system can be the body electronic stability system (ESP) or the brake by wire system (onebox).

The vehicle control device can be a coordinated control software module of low-speed driving and parking redundancy of unmanned vehicles, referred to as redundant coordination design (RCD) software module, which is developed based on the redundant design of driving system and parking system. The embodiment takes the vehicle control device as the RCD software module as an example.

Figure 2:
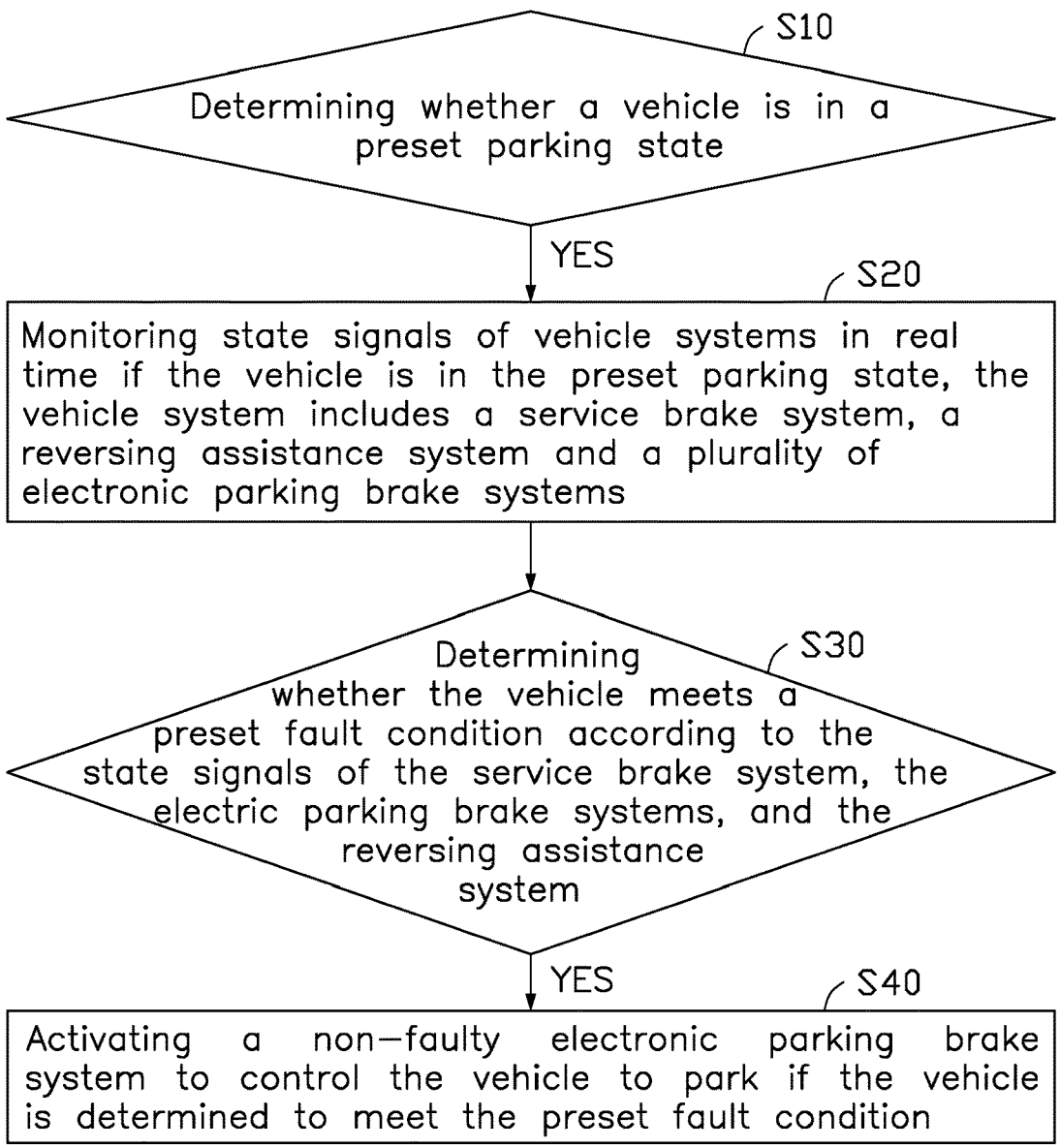
FIG. 2 is a flowchart of a vehicle brake control method according to an embodiment of the present disclosure.

In one embodiment, as shown in FIG. 2, a vehicle brake control method is provided. The vehicle control device of the method applied in the vehicle control system is taken as an example, the method includes the following steps:

At step S10, determining whether a vehicle is in a preset parking state.

The vehicle brake control method in the embodiment can be applied to the vehicle control scenario of low-speed automatic driving, including preset remote parking conditions such as low-speed unattended parking and remote parking. Therefore, it is necessary to first determine whether the vehicle is in the preset parking state, in which the vehicle being in the preset parking state can be determined by the signal of the vehicle system in the vehicle.

In one embodiment, determining whether the vehicle is in a preset parking state requires these determinations:

determining whether the reversing assistance system of the vehicle has successfully been activated.

determining whether the reversing assistance system has been successfully activated according to the state signal of the reversing assistance system in the vehicle.

obtaining a vehicle speed in real time and determining whether the vehicle speed is less than a preset vehicle speed.

determining any slope of the path or environment of the vehicle and determining whether the slope of the environment of the vehicle is less than a preset slope.

The slope of the environment of the vehicle is located is measured by the acceleration sensor.

If the reversing assistance system of the vehicle is activated, if the vehicle speed is less than the preset speed, and if the slope of the environment of the vehicle is less than the preset slope, it is determined that the vehicle is in the preset parking state.

If the reversing assistance system of the vehicle is not activated successfully, if the vehicle speed is not less than the preset vehicle speed, and if the slope of the environment of the vehicle is not less than the preset slope, it is determined that the vehicle is not in the preset parking state.

For example, when the vehicle needs to be parked, if the reversing assistance system of the vehicle is activated, the vehicle speed is less than 10 km/h, and the slope of the environment of the vehicle is less than 10%, it is determined that the vehicle is in the preset parking state. If the reversing assistance system of the vehicle is not activated, if the vehicle speed is not less than 10 km/h, and if the slope of the environment of the vehicle is not less than 10%, it is determined that the vehicle is not in the preset parking state. The application scenario of vehicle brake control method is controlled to be within the parameters of the vehicle speed being not more than 10 km/h and the slope being within 10%, which ensures the safety of vehicle operation in low-speed remote parking condition. If the reversing assistance system is not activated successfully, the relevant control of remote parking is carried out, which reduces unnecessary information collection and processing of the vehicle by the vehicle control device, and reduces the burden of the vehicle.

In the embodiment, the preset vehicle speed of 10 km/h and the preset slope of 10% are only illustrative. In other embodiments, the preset vehicle speed can also be other vehicle speeds, and the preset slope can also be other slopes, which will not be repeated here.

At step S20, monitoring state signals of the vehicle systems in real time if the vehicle is in the preset parking state, the state signals of the vehicle system include the service brake system, the reversing assistance system, and a plurality of electronic parking brake systems.

After determining that the vehicle is in the preset parking state, it means that no one is on the vehicle, and there may be potential safety hazards caused by uncontrolled vehicles. At this time, it is necessary to monitor the state signal of the vehicle system in real time to ensure that the working state of each vehicle system can be known in time, so as to avoid the possibility of accidents caused by the failure to control the vehicle without knowing the working state of each vehicle system in time. The vehicle system includes the service brake system, the reversing assistance system, and multiple electronic parking brake systems. The state signal of the vehicle system includes the state signal of the service brake system, the state signal of the reversing assistance system, and the state signal of multiple electronic parking brake systems.

At step S30, determining whether the vehicle meets a preset fault condition according to the state signals of the service brake system, the electric parking brake systems, and the reversing assistance system.

After monitoring the state signal of the vehicle system in real time, a determination is made as to whether the vehicle meets the preset fault condition according to the state signal of the service brake system, the state signal of the electronic parking brake system, and the state signal of the reversing assistance system. That is, determining whether the vehicle system has a fault according to the state signal of the service brake system, the state signal of the electronic parking brake system, and the state signal of the reversing assistance system. The fault conditions in the embodiment include system failure and system functional loss.

At step S40, activating non-faulty electronic parking brake system to control the vehicle to park if the vehicle is determined to be meeting the preset fault condition.

After determining whether the vehicle meets the preset fault condition according to the state signal of the service brake system, the state signal of the electronic parking brake system and the state signal of the reversing assistance system, if the vehicle is determined to be meeting the preset fault condition, a request is sent to the electronic parking brake system without fault, so that the electronic parking brake system without fault can pull up immediately according to the pull-up request, so as to control the vehicle to park, so as to ensure the safety of the vehicle. That is, in the service brake system, the reversing assistance system, and multiple electronic parking brake systems, as long as there is a fault in the vehicle system, it is necessary to consider interrupting the parking action, stopping the vehicle and parking in place.

In addition, when the vehicle is in the preset parking state, the monitoring and state signal acquisition of the vehicle controller (VCU) is not being carried out, and the RCD software module will send a request of driving torque of 0 to the VCU, to avoid accidental movement. For example, to prevent the reversing assistance system (RPA) from sending a request with driving torque of 0, resulting in VCU output torque, resulting in accidents, so as to ensure the safety of the vehicle.

In the embodiment, a simple control scheme is designed for the vehicles with single service brake system and dual parking brake system. When the vehicle is in the preset parking state, the vehicle is controlled by monitoring the state signals of service brake system, the reversing assistance system, and the electronic parking brake system in real time. When the system failure of the vehicle is determined according to the system state signals, the normal electronic parking brake system is pulled up directly to make the vehicle park in place, so as to ensure the safety of the vehicle in low-speed remote parking, solving the problem that there is no matching control scheme to control the vehicle to complete remote parking in vehicles equipped with single service brake system and dual parking brake system, resulting in potential safety hazards.

In one embodiment, after step S30, after determining whether the vehicle meets the preset fault condition according to the state signals of the service brake system, the electronic parking brake system, and the reversing assistance system, the method also specifically includes the following steps:

At step S301, determining whether the real-time vehicle speed of the vehicle is greater than the preset vehicle speed if the vehicle is determined to not be meeting the preset fault condition.

After determining whether the vehicle meets the preset fault condition according to the state signal of the service brake system, the state signal of the electronic parking brake system, and the state signal of the reversing assistance system, if the vehicle is determined that does not meet the preset fault condition, it indicates that the working conditions of the parking brake system, the electric parking brake system, and the reversing assistance system are normal, and there is no need for protective parking under the condition of the system fault. At this time, it is necessary to determine whether the real-time vehicle speed of the vehicle is greater than the preset vehicle speed, so as to determine whether overspeed error prevention measures are required according to the speed.

At step S302, activating the electronic parking brake system to control the vehicle to park if the real-time vehicle speed of the vehicle is greater than the preset speed.

When the vehicle is found to not meet the preset fault condition, after determining whether the real-time vehicle speed is greater than the preset vehicle speed, if the real-time vehicle speed of the vehicle is greater than the preset vehicle speed, it indicates that there is an accident causing the speed to exceed the speed limit under the preset parking state, which may have potential safety hazards. At this time, it is necessary to activate the electronic parking brake system to control the vehicle to park, so as to avoid safety accidents and improve the safety of the vehicle.

In the embodiment, after determining whether the vehicle meets the preset fault condition according to the state signal of the service brake system, the state signal of the electronic parking brake system, and the state signal of the reversing assistance system, if the vehicle is determined to not be meeting the preset fault condition, determine whether the real-time vehicle speed of the vehicle is greater than the preset vehicle speed.

Figure 3:
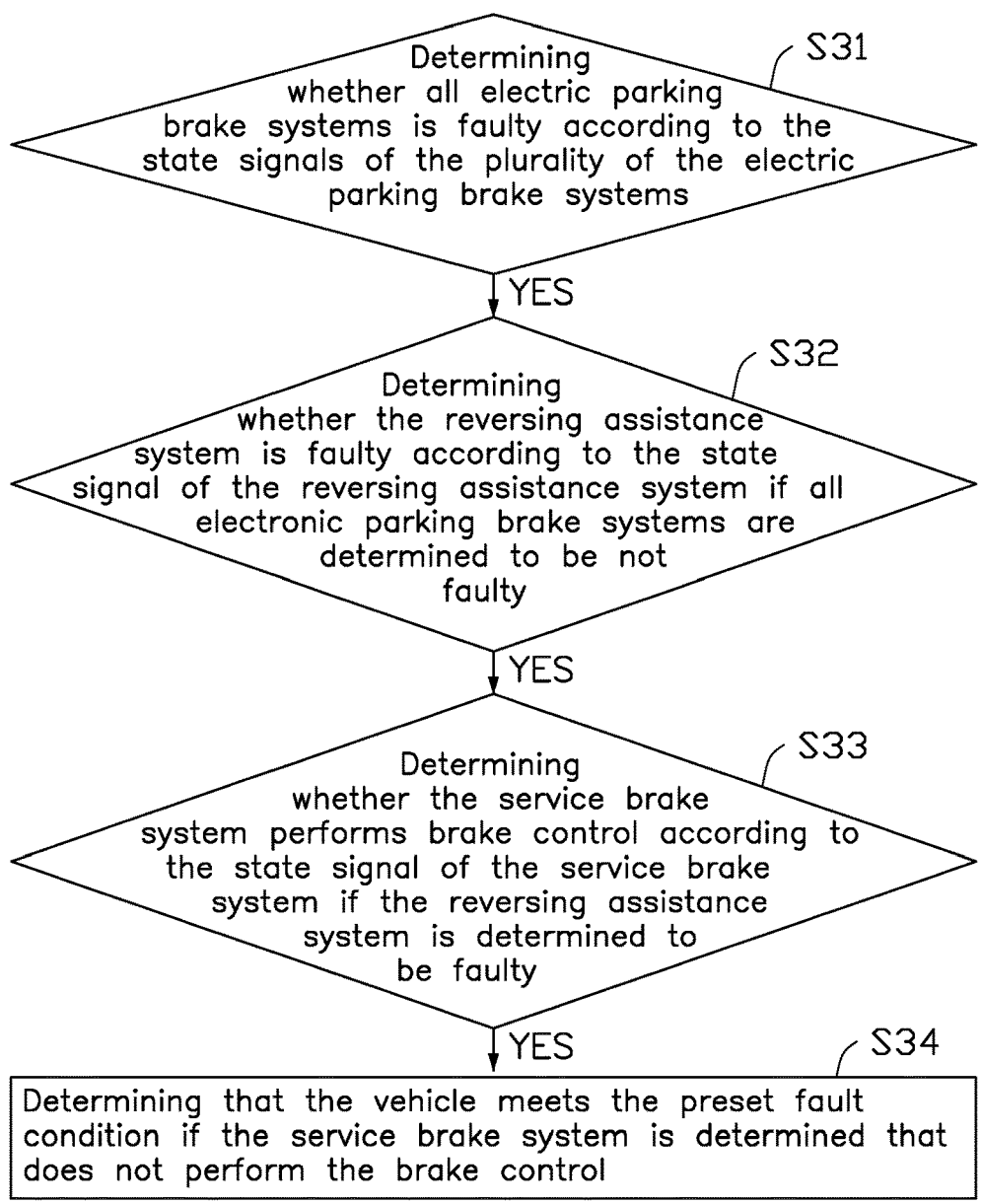
FIG. 3 is a flowchart of implementation of step S30 of the flowchart in FIG. 2.

In one embodiment, as shown in FIG. 3, in step S30, determining whether the vehicle meets the preset fault condition according to the state signals of the service brake system, the electric parking brake system, and the reversing assistance system, includes the following steps:

At step S31, determining whether all electric parking brake systems is faulty according to the state signals of the plurality of the electric parking brake systems.

After obtaining the state signals of multiple electronic parking brake systems, determine whether all electronic parking brake systems have faults according to the state signals of multiple electronic parking brake systems, so as to carry out different vehicle control according to the determined condition.

At step S32, determining whether the reversing assistance system is faulty according to the state signal of the reversing assistance system if all electronic parking brake systems are determined to be not faulty.

If it is determined that all the electronic parking brake systems are fault-free, it means that all the electronic parking brake systems on the vehicle are working normally, then it is further determined whether the reversing assistance system is faulty according to the state signal of the reversing assistance system.

For example, the dual electric parking brake system can be the left electric parking brake system set on the left side of the vehicle and the right electric parking brake system set on the right side of the vehicle. Whether the left electric parking brake system is faulty is determined according to the state signal of the left electric parking brake system, and whether the right electric parking brake system is faulty is determined according to the state signal of the right electric parking brake system. If neither the left electric parking brake system or the right electric parking brake system is faulty, it is necessary to further determine whether the reversing assistance system is faulty according to the state signal of the reversing assistance system.

At step S33, determining whether the service brake system performs brake control according to the state signal of the service brake system if the reversing assistance system is determined to be faulty.

After determining that all electric parking brake systems are fault-free and determining whether the reversing assistance system is faulty according to the state signal of the reversing assistance system, if the reversing assistance system is determined to be faulty, indicating that the vehicle is prone to safety problems and needs to stop the vehicle immediately, determine whether the service brake system performs brake control according to the state signal of the service brake system.

At step S34, determining that the vehicle meets the preset fault condition if the service brake system is determined to be not performing the brake control.

After determining that the reversing assistance system is faulty, determine whether the service brake system performs the brake control according to the state signal of the service brake system. If the service brake system is determined to be not under braking control, it indicates that there may be a problem with the service brake system. In order to ensure the safety of the vehicle, it is necessary to control the vehicle to park, then it is determined that the vehicle meets the preset fault condition.

For example, if the state signal of the reversing assistance system is invalid when it is determined that all the electronic parking brake system EPBS are fault-free, it indicates that the reversing assistance system is failed, the reversing assistance system is determined to be faulty, and the state signal of the service brake system ESP needs to be monitored. It may be found that the master cylinder hydraulic pressure of the service brake system has no pressure within a preset time (such as 500 ms), indicating that the service brake system ESP has not carried out the action of controlling brake, and it is determined that the service brake system has not carried out brake control. At this time, the vehicle is determined to meet the preset fault condition, it is necessary to activate the faulty electronic parking brake system EPB to control the vehicle to park and ensure the safety of the vehicle.

In the embodiment, if the state signal of the reversing assistance system is invalid, the determination that the reversing assistance system is faulty is only an example. In other embodiments, the manner of determining the failure of the reversing assistance system can also be other manner, which will not be repeated here.

In the embodiment, if the master cylinder hydraulic pressure of the service brake system has no value of pressure within the preset duration, it is only an example to determine that the service brake system is not under brake control, and the preset duration is 500 ms, which is only an example. In other embodiments, the method of determining that the service brake system does not perform the brake control can also be by other indicator, and the preset duration can also be other duration, which will not be repeated here.

In the embodiment, determine whether all electric parking brake systems have faults according to the state signals of multiple electric parking brake systems. If it is determined that all electronic parking brake systems are fault-free, determine whether the reversing assistance system is faulty according to the state signal of the reversing assistance system. If it is determined that the reversing assistance system is faulty, determine whether the service brake system performs the brake control according to the state signal of the service brake system. If it is determined that the service brake system does not perform the brake control, it is determined that the vehicle meets the preset fault condition, the steps of determining whether the vehicle meets the preset fault condition are according to the state signals of the service brake system, the electronic parking brake system, and the reversing assistance system are detailed. The logic of determining the preset fault condition is clarified, which provides a basis for the subsequent control of the vehicle parking.

In one embodiment, after determining that all electronic parking brake systems are fault-free, the method also specifically includes the following steps:

At step S36, determining whether the service brake system is faulty according to the state signal of the service brake system.

After determining that all the electronic parking brake systems are fault-free, it can also directly determine whether the service brake system has a fault according to the state signal of the service brake system, so as to determine whether the preset fault condition is met according to the specific working state of the service brake system.

At step S37, determining that the vehicle meets the preset fault condition if the service brake system is faulty.

After determining whether the service brake system is faulty according to the state signal of the service brake system, if the service brake system is faulty, determine that the vehicle meets the preset fault condition, directly activate the electronic parking brake system, so that all electronic parking brake systems cooperate to control the vehicle to park.

In the embodiment, after determining that all electronic parking brake systems are fault-free, determine whether the service brake system has fault according to the state signal of the service brake system, and if the service brake system is faulty, the vehicle is determined to meet the preset fault condition. When there is no fault in the electronic parking brake system, further determine whether it meets the preset fault condition according to the state signal of the service brake system and increase the working conditions that meet the preset fault condition, so as to increase the working conditions of activating the electronic parking brake system for parking, and thus improve the safety of the vehicle.

In one embodiment, after step S31, after determining whether the electronic parking brake system is faulty according to the state signal of the electronic parking brake system, the method also specifically includes the following steps:

At step S311, sending a deceleration for parking request to the service brake system if one of the electric parking brake systems is determined to be faulty and another electric parking brake system is determined to be not faulty.

After determining whether the electric parking brake system is faulty according to the state signal of the electric parking brake system, if it is determined that one of the electric parking brake systems is faulty and another electric parking brake system is not faulty, a deceleration for parking request is sent to the service brake system, in order to make the service brake system cooperate with the electronic parking brake system without failure to slow down and park according to the deceleration for parking request, so as to ensure the safety of the vehicle.

At step S312, determining whether the service brake system performs the deceleration for parking request.

After sending the deceleration for parking request to the service brake system, determine whether the service brake system performs the deceleration for parking request to determine whether parking is required according to the execution.

At step S313, determining that the vehicle meets the preset fault condition if the service brake system does not perform the deceleration for parking request.

After determining whether the service brake system performs a deceleration for parking request, if the service brake system does not perform the deceleration for parking request, then the vehicle is determined to meet the preset fault condition, so that the non-faulty electronic parking brake system can be activated immediately.

In the embodiment, after determining whether the electric parking brake system is faulty according to the state signal of the electric parking brake system, further determine whether the preset fault condition is met according to the specific fault conditions of each electronic parking brake system. If it is determined that one electric parking brake system is faulty and another electric parking brake system is not faulty, send a deceleration for parking request to the service brake system, and then determine whether the service brake system performs same. If the service brake system does not execute the request, it is determined that the vehicle meets the preset fault conditions, which further increases the working conditions that meet the preset fault condition, thus increasing the working conditions of activating the electronic parking brake system for parking, and then improving the safety of the vehicle.

Figure 4:
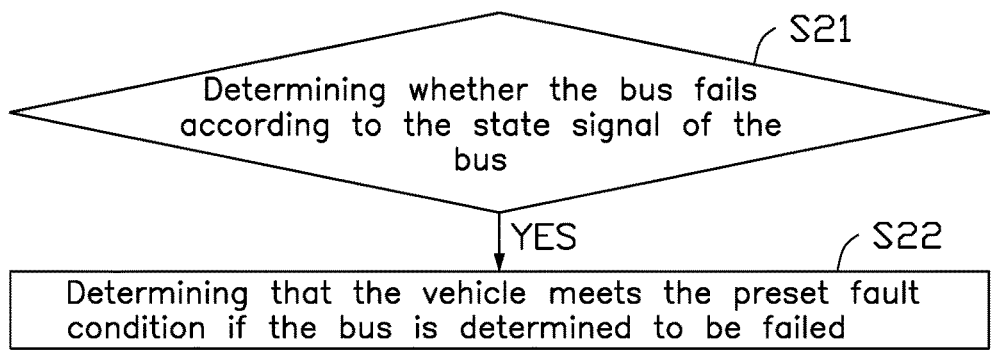
FIG. 4 is another flowchart of the vehicle brake control method according to an embodiment of the present disclosure.

In one embodiment, as shown in FIG. 4, the state signal of the vehicle system also includes the state signal of the bus, after step S20, that is, after monitoring the state signal of the vehicle system in real time, the method also specifically includes the following steps:

At step S21, determining whether the bus fails according to the state signal of the bus.

The state signal of the vehicle system also includes the state signal of the bus, after determining that the vehicle is in the preset parking state and monitoring the state signal of the vehicle system in real time, determine whether the bus fails according to the state signal of the bus in the state signal of the vehicle system, so as to determine whether parking is required according to the state of the bus.

At step S22, determining that the vehicle meets the preset fault condition if the bus is determined to be failed.

After determining whether the bus is failed according to the state signal of the bus, if it is determined that the bus is failed, it means that the state signals of the vehicle system including the service brake system, electronic parking brake system, and the reversing assistance system cannot be monitored and obtained, the operating state of the service brake system, the electric parking brake system, and the reversing assistance system cannot be determined, in order to ensure the safety of the vehicle, it is determined that the vehicle meets the preset fault condition, so as to activate the faultless electronic parking system and reduce safety hazards.

In the embodiment, after determining that the vehicle is in the preset parking state and monitoring the state signal of the vehicle system in real time, by determining whether the bus is failed according to the state signal of the bus, so as to determine whether parking is required according to the state of the bus. If it is determined that the bus is failed, the vehicle is determined to meet the preset fault condition, which reduces the safety hazards caused by the failure of the bus and the inability to determine the working state of the service brake system, the electronic parking brake system, and the reversing assistance system, further increasing the working conditions that meet the preset fault condition, so as to increase the working conditions of activating the electronic parking brake system for parking, and then improve the safety of the vehicle.

In one embodiment, in step S40, if the vehicle is determined to meet the preset fault condition, before activating the fault-free electronic parking brake system, the method also includes the following steps:

At step S41, obtaining environmental information of the vehicle. The environmental information includes road information and the distance between the vehicle and the nearest obstacle in the driving direction.

If the vehicle is determined to meet the preset fault condition, the vehicle speed needs to be verified before activating the non-faulty electronic parking brake system to ensure that the vehicle speed of activating the non-faulty electronic parking brake system meets the requirements of safe braking. Therefore, it is necessary to obtain the environmental information of the vehicle before activating the non-faulty electronic parking brake system, and then determine the safe speed required for braking at this time according to the environmental information of the vehicle. The environmental information includes road information, distance between the vehicle and the nearest obstacle in the driving direction, and road information includes slope, pavement smoothness, and other information.

At step S42, determining an initial vehicle speed of vehicle parking according to the road information and the distance to obstacle.

After obtaining the road information and distance, query the preset safety data according to the road information and the obstacle distance to determine the initial vehicle speed of the vehicle for parking.

The preset safety data is the initial vehicle speed of the vehicle for safe parking under different road information and distances to obstacles, including different road information, distance to obstacle, and initial vehicle speed.

For example, the preset safety data is formulated as the initial vehicle speed map and built into the vehicle, after obtaining the road information and the distance to obstacle, query the built-in initial vehicle speed map according to the road information and the distance to obtain the initial vehicle speed when the vehicle is parked.

In the embodiment, the preset safety data is formulated as the initial vehicle speed map and built into the vehicle for example only. In other embodiments, the preset security data can also be formulated into other data forms, which will not be repeated here.

In one embodiment, the preset safety data is obtained through the vehicle safety parking test. The vehicle safety parking test is conducted on one or more roads with different smoothness and slopes and under the working condition of different distances to obstacle, so as to obtain the safe initial vehicle speed of the vehicle parking on the road with different smoothness and slope and under the working condition of different distances in the vehicle safety parking test and summarize it as the preset safety data.

In the embodiment, the preset safety data obtained through the vehicle safety parking test is only an exemplary description. In other embodiments, the preset safety data can also be obtained in other ways, which will not be repeated here.

At step S43, determining whether the vehicle speed before activating the non-faulty electric parking brake system is greater than the initial vehicle speed.

Obtain the vehicle speed before activating the non-faulty electric parking brake system, and obtain the vehicle speed before activating the non-faulty electric parking brake system, and after determining the initial vehicle speed at which the vehicle is parked, determine whether the vehicle speed before activating the non-faulty electronic parking brake system is greater than the initial vehicle speed, so as to determine whether the vehicle speed needs to be adjusted according to the determination.

At step S44, control the vehicle to park at the initial vehicle speed if the vehicle speed before activating the non-faulty electronic parking brake system is greater than the initial vehicle speed.

After determining whether the vehicle speed before activating the non-faulty electric parking brake system is greater than the initial vehicle speed, if the vehicle speed before activating the non-faulty electronic parking brake system is greater than the initial vehicle speed, it indicates that the vehicle speed is too high at this time. When parking at this speed, it may collide with the nearest obstacle during parking, it is necessary to reduce the speed to make the vehicle park safely, and control the vehicle to park at the initial vehicle speed to ensure the safety of the vehicle.

In determining whether the vehicle speed before activating the non-faulty electric parking brake system is greater than the initial vehicle speed, if the vehicle speed before activating the non-faulty electronic parking brake system is not greater than the initial vehicle speed, it indicates that the vehicle speed at this time is the safe parking speed. When parking at this speed, it is less likely to collide with the nearest obstacle during parking, the vehicle can be parked directly at the speed before activating the non-faulty electronic parking brake system.

In the embodiment, if the vehicle is determined to meet the preset fault condition, before activating the non-faulty electric parking brake system, by obtaining the environmental information of the vehicle, the environmental information includes road information and the distance between the vehicle and the nearest obstacle in the driving direction, determine the initial vehicle speed when the vehicle is parked according to the road information and the distance to obstacle, determine whether the vehicle speed before activating the non-faulty electric parking brake system is greater than the initial vehicle speed, if the vehicle speed before parking is greater than the initial vehicle speed, control the vehicle to park at the initial vehicle speed, reducing the possibility of collision with the nearest obstacle during parking, and further ensuring the safety of the vehicle.

In one embodiment, after step S40, after controlling the vehicle to park, the method also specifically includes the following steps:

At step S51, determining whether a parking release command from a driver or a whole vehicle controller is received.

After controlling the vehicle to park, determine whether the parking release command from the driver or the whole vehicle controller is received, and then determine whether it is in fact released, so as to avoid the accident caused by releasing the electronic parking brake system when the vehicle is in the preset parking state and the vehicle system is faulty.

For example, when the brake pedal pressing signal is received, or the vehicle is detected to enter the power on state from the power off state, and the electronic parking brake system switch pressing signal is received, or the brake pedal shift signal is received (stepping on the brake pedal to shift from P gear to D gear or R gear), determine whether the parking release command of the driver is received. When receiving the shift command of the whole vehicle controller from gear P to gear D or gear R, it is determined that the parking release command of the whole vehicle controller is received.

In the embodiment, determine whether a parking release command from the driver or the vehicle controller is received in the above manner is only an exemplary illustration. In other embodiments, it can also be determined by other ways whether the parking release command of the driver or the whole vehicle controller is received, which will not be repeated here.

At step S52, determining whether the reversing assistance system controls the vehicle if the parking release command from the driver or the vehicle controller is received.

After determining whether the parking release command from the driver or the whole vehicle controller is received, if the parking release command from the driver or the whole vehicle controller is received, it indicates that the vehicle has been controlled by a driver. At this time, there is no need for service brake redundancy or parking brake redundancy, then it is further determined whether the reversing assistance system controls the vehicle.

Determine whether the reversing assistance system controls the vehicle according to the state signal of the reversing assistance system. For example, when the reversing assistance system exits the parking state, or the activation signal of the reversing assistance system is invalid, or the state signal of the reversing assistance system is invalid, it is determined that the reversing assistance system does not control the vehicle.

At step S53, controlling the electric parking brake system to execute the parking release command if the reversing assistance system is determined to be not controlling the vehicle.

After determining whether the reversing assistance system controls the vehicle, if the reversing assistance system is determined to be not controlling the vehicle, at this time, the vehicle has been controlled by a driver and the safety of the vehicle is guaranteed, then the electronic parking brake system is controlled to execute the parking release command.

In the embodiment, after controlling the vehicle to park, by determining whether to receive the parking release command from the driver or the whole vehicle controller, it can determine whether to perform the parking release according to the determination. If the parking release command from the driver or the vehicle controller is received, determining whether the reversing assistance system controls the vehicle. If it is determined that the reversing assistance system does not control the vehicle, controlling the electric parking brake system to execute the parking release command. After receiving the parking release command from the driver or the whole vehicle controller and not being in the preset parking state, the parking release can reduce the likelihood of accidents caused by releasing the electronic parking brake system when the vehicle is in the preset parking state and the vehicle system is faulty, and further improve the safety of the vehicle.

It should be understood that the sequence number of each step in the above embodiment does not mean an order of execution. The execution order of each process should be determined by its function and internal logic and should not constitute any limitation on the implementation process of the embodiment of the present disclosure.

Figure 5:
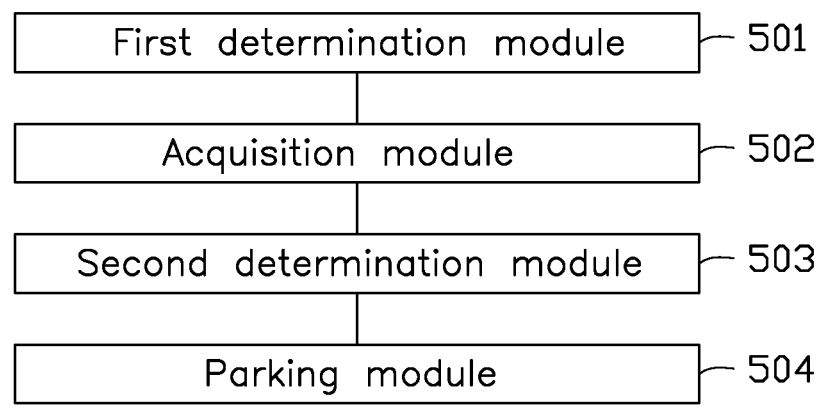
FIG. 5 is a structural diagram of a vehicle control device according to an embodiment of the present disclosure.

In one embodiment, a vehicle control device is provided, the vehicle control device corresponds to the vehicle brake control method in the above embodiment. As shown in FIG. 5, the vehicle control device includes a first determination module 501, an acquisition module 502, a second determination module 503, and a parking module 504. The detailed description of each functional module is as follows:

The first determination module 501 is used to determine whether the vehicle is in a preset parking state.

The acquisition module 502 is used to monitor the state signal of the vehicle system in real time if the vehicle is in the preset parking state. The vehicle system includes a service brake system, a reversing assistance system, and two electronic parking brake systems.

The second determination module 503 is used to determine whether the vehicle meets the preset fault condition according to the state signals of the service brake system, the electronic parking brake system, and the reversing assistance system.

The parking module 504 is used to activate a non-faulty electronic parking brake system to control the vehicle to park if the vehicle is determined to meet the preset fault condition.

Further, the second determination module 503 is specifically used to:
  determine whether all the electronic parking brake systems have faulty according to the state signals of the plurality of electronic parking brake systems;
  determine whether the reversing assistance system has faulty according to the state signal of the reversing assistance system if it is determined that all the electronic parking brake systems have not faulty;
  determine whether the service brake system performs brake control according to the state signal of the service brake system if it is determined that the reversing assistance system is faulty;
  determine that the vehicle meets the preset fault condition if it is determined that the service brake system does not perform the brake control.

Further, the second determination module 503 is specifically used to:
  determine whether the service brake system is faulty according to the state signal of the service brake system;
  determine that the vehicle meets the preset fault condition if the service brake system is faulty.

Further, the second determination module 503 is specifically used to:
  send a deceleration for parking request to the service brake system if it is determined that one of the electric parking brake systems is faulty and another electric parking brake system is not faulty;
  determine whether the service brake system performs the deceleration for parking request;
  determine that the vehicle meets the preset fault condition if the service brake system does not execute the deceleration for parking request.

Further, the state signal of the vehicle system also includes the state signal of the bus, the second determination module 503 is specifically used to:
  determine whether the bus is failed according to the state signal of the bus;
  determine that the vehicle meets the preset fault condition if the bus is determined to be failed.

Further, the parking module 504 is also specifically used to:
  determine whether the real-time vehicle speed of the vehicle is greater than the preset vehicle speed if it is determined that the vehicle does not meet the preset fault condition;
  activate the electronic parking brake system to control the vehicle to park if the real-time vehicle speed of the vehicle is greater than the preset vehicle speed.

Further, the parking module 504 is also specifically used to:
  determine whether the parking release command from the driver or the whole vehicle controller is received;

determine whether the reversing assistance system controls the vehicle if the parking release command of the driver or the whole vehicle controller is received;

control the electronic parking brake system to execute the parking release command if it is determined that the reversing assistance system does not control the vehicle.

Further, the parking module 504 is also specifically used to:

obtain the environmental information of the vehicle, and the environmental information includes road information and the obstacle distance between the vehicle and the nearest obstacle in the driving direction;

determine the initial vehicle speed of the vehicle for parking according to the road information and the obstacle distance;

determine whether the vehicle speed before activating the non-faulty electronic parking brake system is greater than the initial vehicle speed;

control the vehicle to park at the initial vehicle speed if the vehicle speed before activating the non-faulty electronic parking brake system is greater than the initial vehicle speed.

For the specific definition of the vehicle control device, please refer to the above definition of the vehicle brake control method, which will not be repeated here. Each module in the above vehicle control device can be realized in whole or in part by software, hardware and their combinations. The above modules can be embedded in or independent of the processor in the computer device in the form of hardware, or stored in the memory in the computer device in the form of software, so that the processor can call and execute the corresponding operations of the above modules.

In one embodiment, a vehicle control device is provided. The vehicle control device includes a processor and a memory connected through a system bus. The processor of the computer device is used to provide computing and control capabilities. The memory of the vehicle control device includes a nonvolatile storage medium and an internal memory. The nonvolatile storage medium stores an operating system and computer-readable instructions. The internal memory provides an environment for the operation of the operating system and computer-readable instructions in the nonvolatile storage medium. The computer-readable instruction is executed by the processor to realize the above vehicle control device method.

Figure 6:
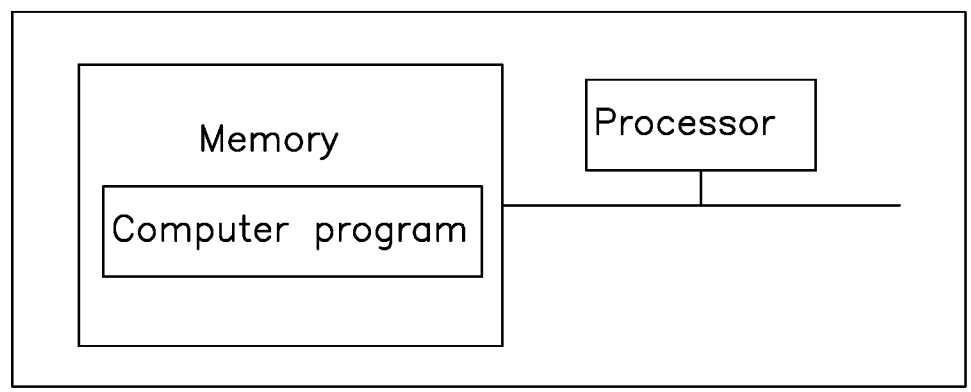
FIG. 6 is another structural diagram of a vehicle control device according to an embodiment of the present disclosure.

In one embodiment, as shown in FIG. 6, a vehicle control device is provided, which includes a memory, a processor and computer-readable instructions stored on the memory and can be run on the processor. When the processor executes the computer-readable instructions, the steps of realizing the method of the vehicle control device are provided.

In one embodiment, a computer-readable storage medium is provided, on which computer-readable instructions are stored. When the computer-readable instructions are executed by the processor, the steps of realizing the method of the vehicle control device are provided.

Those skilled in the art can understand that all or part of the process of realizing the above embodiment method can be completed by instructing relevant hardware through computer-readable instructions. The computer-readable instructions can be stored in a nonvolatile computer-readable storage medium. When the computer-readable instruction is executed, the computer-readable instruction may include a flow of the embodiments of the above methods. Any reference to memory, storage, database or other media used in the embodiments provided in the present disclosure may include nonvolatile and/or volatile memory. The nonvolatile memory may include read only memory (ROM), programmable ROM (PROM), electrically programmable ROM (EPROM), electrically erasable programmable ROM (EEPROM), or flash memory. The volatile memory may include random access memory (RAM) or external cache memory. As an illustration rather than limitation, ram is available in various forms, such as static RAM (SRAM), dynamic RAM (DRAM), synchronous DRAM (SDRAM), dual data rate SDRAM (DDRSDRAM), enhanced SDRAM (ESDRAM), synchronous link DRAM (SLDRAM), Rambus direct RAM (RDRAM), direct memory bus dynamic RAM (DRDRAM), and memory bus dynamic RAM (RDRAM).

Those skilled in the art can clearly understand that for the convenience and simplicity of description, only the division of the above functional units and modules is illustrated. In practical application, the above functions can be allocated by different functional units and modules according to needs, that is, the internal structure of the device can be divided into different functional units or modules to complete all or part of the functions described above.

The above embodiments are only used to illustrate the technical scheme of the application, not to limit it, although the present application is described in detail with reference to the foregoing embodiments, those of ordinary skill in the art should understand that they can still modify the technical scheme recorded in the above embodiments, or equivalently replace some of the technical features, these modifications or substitutions do not separate the essence of the corresponding technical solutions from the spirit and scope of the technical solutions of the embodiments of the present disclosure, and should be included in the protection scope of the present disclosure.

What is claimed is:

1. A vehicle brake control method comprising:

determining whether the vehicle is in a preset parking state;

monitoring state signals of vehicle systems in real time if the vehicle is in the preset parking state; wherein the vehicle system comprises a service brake system, a reversing assistance system and a plurality of electronic parking brake systems;

determining whether the vehicle meets a preset fault condition according to the state signals of the service brake system, the plurality of the electronic parking brake systems, and the reversing assistance system; and activating a non-faulty electronic parking brake system to control the vehicle to park if the vehicle is determined to meet the preset fault condition.

2. The vehicle brake control method of claim 1, wherein the determining whether the vehicle meets a preset fault condition according to the state signals of the service brake system, the plurality of electronic parking brake systems, and the reversing assistance system, comprises:

determining whether each and every one of the electronic parking brake systems is faulty according to the state signals of the plurality of electronic parking brake systems;

determining whether the reversing assistance system is faulty according to the state signal of the reversing assistance system if each and every one of the electronic parking brake systems is determined to be not faulty;

determining whether the service brake system performs brake control according to the state signal of the service brake system if the reversing assistance system is determined to be faulty;

determining the vehicle meets the preset fault condition if the service brake system is determined to not performing the brake control.

3. The vehicle brake control method of claim 2, wherein after each and every one of the electronic parking brake systems is determined to be not faulty, the vehicle brake control method further comprises:

determining whether the service brake system is faulty according to the state signal of the service brake system;

determining the vehicle meets the preset fault condition if the service brake system is faulty.

4. The vehicle brake control method of claim 2, wherein after determining whether each and every one of the electronic parking brake systems is faulty according to the state signals of the plurality of electronic parking brake systems, the vehicle brake control method further comprises:

sending a deceleration for parking request to the service brake system if one of the electric parking brake systems is determined to be faulty and another electric parking brake system is determined to be not faulty;

determining whether the service brake system performs the deceleration for parking request;

determining the vehicle meets the preset fault condition if the service brake system does not perform the deceleration for parking request.

5. The vehicle brake control method of claim 1, wherein the state signals of the vehicle systems further comprise state signals of a bus, and after monitoring state signals of the vehicle systems in real time, the vehicle brake control method further comprises:

determining whether the bus fails according to the state signals of the bus;

determining the vehicle meets the preset fault condition if the bus is determined to be failed.

6. The vehicle brake control method of claim 1, wherein after determining whether the vehicle meets a preset fault condition according to the monitored state signals of the service brake system, the plurality of electronic parking brake systems, and the reversing assistance system, the vehicle brake control method further comprises:

determining whether a real-time vehicle speed of the vehicle is greater than a preset vehicle speed if the vehicle is determined to not meeting the preset fault condition;

activating the electronic parking brake system to control the vehicle to park if the real-time vehicle speed of the vehicle is greater than the preset vehicle speed.

7. The vehicle brake control method of claim 1, wherein after activating the non-faulty electronic parking brake system to control the vehicle to park if the vehicle is determined to meet the preset fault condition, the vehicle brake control method further comprises:

determining whether a parking release command from a driver or a whole vehicle controller is received;

determining whether the reversing assistance system controls the vehicle if the parking release command of the driver or the whole vehicle controller is received;

controlling the electronic parking brake system to perform the parking release command if the reversing assistance system is determined not controlling the vehicle.

8. The vehicle brake control method of claim 1, wherein before activating the non-faulty electronic parking brake system, the vehicle brake control method further comprises:

obtaining an environmental information of the vehicle, wherein the environmental information comprises a road information and an obstacle distance between the vehicle and a nearest obstacle in a driving direction;

determining an initial vehicle speed of the vehicle for parking according to the road information and the obstacle distance;

determining whether a vehicle speed before activating the non-faulty electronic parking brake system is greater than the initial vehicle speed;

controlling the vehicle to park at the initial vehicle speed if the vehicle speed before activating the non-faulty electronic parking brake system is greater than the initial vehicle speed.

9. A vehicle brake control device comprising:

a first determination module configured for determining whether the vehicle is in a preset parking state;

an acquisition module configured for monitoring state signals of vehicle systems in real time if the vehicle is in the preset parking state; wherein the vehicle system comprises a service brake system, a reversing assistance system and a plurality of electronic parking brake systems;

a second determination module configured for determining whether the vehicle meets a preset fault condition according to the state signals of the service brake system, the plurality of the electronic parking brake systems, and the reversing assistance system;

a parking module configured for activating a non-faulty electronic parking brake system to control the vehicle to park if the vehicle is determined to meet the preset fault condition.

10. The vehicle brake control device of claim 9, wherein the second determination module is specifically configured for:

determining whether each and every one of the electronic parking brake systems is faulty according to the state signals of the plurality of electronic parking brake systems;

determining whether the reversing assistance system is faulty according to the state signal of the reversing assistance system if each and every one of the electronic parking brake systems is determined to be not faulty;

determining whether the service brake system performs brake control according to the state signal of the service brake system if the reversing assistance system is determined to be faulty;

determining the vehicle meets the preset fault condition if the service brake system is determined to not performing the brake control.

11. The vehicle brake control device of claim 10, wherein after each and every one of the electronic parking brake systems is determined to be not faulty, the second determination module is specifically configured for:

determining whether the service brake system is faulty according to the state signal of the service brake system;

determining the vehicle meets the preset fault condition if the service brake system is faulty.

12. The vehicle brake control device of claim 10, wherein after determining whether each and every one of the electronic parking brake systems is faulty according to the state signals of the plurality of electronic parking brake systems, the second determination module is specifically configured for:
  sending a deceleration for parking request to the service brake system if one of the electric parking brake systems is determined to be faulty and another electric parking brake system is determined to be not faulty;
  determining whether the service brake system performs the deceleration for parking request;
  determining the vehicle meets the preset fault condition if the service brake system does not perform the deceleration for parking request.

13. One or more readable storage medium storing computer-readable instructions that, when the computer-readable instructions are executed by one or more processors, causes the one or more processors to perform following steps:
  determining whether the vehicle is in a preset parking state;
  monitoring state signals of vehicle systems in real time if the vehicle is in the preset parking state; wherein the vehicle system comprises a service brake system, a reversing assistance system and a plurality of electronic parking brake systems;
  determining whether the vehicle meets a preset fault condition according to the state signals of the service brake system, the plurality of the electronic parking brake systems, and the reversing assistance system;
  activating a non-faulty electronic parking brake system to control the vehicle to park if the vehicle is determined to meet the preset fault condition.

14. The readable storage medium of claim 13, wherein the determining whether the vehicle meets a preset fault condition according to the state signals of the service brake system, the plurality of electronic parking brake systems, and the reversing assistance system, comprises:
  determining whether each and every one of the electronic parking brake systems is faulty according to the state signals of the plurality of electronic parking brake systems;
  determining whether the reversing assistance system is faulty according to the state signal of the reversing assistance system if each and every one of the electronic parking brake systems is determined to be not faulty;
  determining whether the service brake system performs brake control according to the state signal of the service brake system if the reversing assistance system is determined to be faulty;
  determining the vehicle meets the preset fault condition if the service brake system is determined to not performing the brake control.

15. The readable storage medium of claim 14, wherein after each and every one of the electronic parking brake systems are determined to be not faulty, when the computer-readable instructions are executed by one or more processors, the one or more processors further perform following steps:
  determining whether the service brake system is faulty according to the state signal of the service brake system;
  determining the vehicle meets the preset fault condition if the service brake system is faulty.

16. The readable storage medium of claim 14, wherein after determining whether each and every one of the electronic parking brake systems is faulty according to the state signals of the plurality of electronic parking brake systems, when the computer-readable instructions are executed by one or more processors, the one or more processors further perform following steps:
  sending a deceleration for parking request to the service brake system if one of the electric parking brake systems is determined to be faulty and another electric parking brake system is determined to be not faulty;
  determining whether the service brake system performs the deceleration for parking request;
  determining the vehicle meets the preset fault condition if the service brake system does not perform the deceleration for parking request.

17. The readable storage medium of claim 13, wherein the state signal of the vehicle system further comprises state signals of a bus, after monitoring state signals of vehicle systems in real time, when the computer-readable instructions are executed by one or more processors, the one or more processors further perform following steps:
  determining whether the bus fails according to the state signals of the bus;
  determining the vehicle meets the preset fault condition if the bus is determined to be failed.

18. The readable storage medium of claim 13, wherein after determining whether the vehicle meets a preset fault condition according to the state signals of the service brake system, the electronic parking brake systems, and the reversing assistance system, when the computer-readable instructions are executed by one or more processors, the one or more processors further perform the following steps:
  determining whether a real-time vehicle speed of the vehicle is greater than a preset vehicle speed if the vehicle is determined to be not meeting the preset fault condition;
  activating the electronic parking brake system to control the vehicle to park if the real-time vehicle speed of the vehicle is greater than the preset vehicle speed.

19. The readable storage medium of claim 13, wherein after control the vehicle to park, when the computer-readable instructions are executed by one or more processors, the one or more processors further perform following steps:
  determining whether a parking release command from a driver or a whole vehicle controller is received;
  determining whether the reversing assistance system controls the vehicle if the parking release command of the driver or the whole vehicle controller is received;
  controlling the electronic parking brake system to perform the parking release command if the reversing assistance system is determined to be not controlling the vehicle.

20. The readable storage medium of claim 13, wherein before activating a non-faulty electronic parking brake system, when the computer-readable instructions are executed by one or more processors, the one or more processors further perform following steps:
  obtaining an environmental information of the vehicle, wherein the environmental information comprises a road information and an obstacle distance between the vehicle and a nearest obstacle in a driving direction;
  determining an initial vehicle speed of the vehicle for parking according to the road information and the obstacle distance;
  determining whether a vehicle speed before activating the non-faulty electronic parking brake system is greater than the initial vehicle speed;
  controlling the vehicle to park at the initial vehicle speed if the vehicle speed before activating the non-faulty electronic parking brake system is greater than the initial vehicle speed.

* * * * *